(12) United States Patent
Paulsen et al.

(10) Patent No.: US 12,254,360 B2
(45) Date of Patent: Mar. 18, 2025

(54) VISITOR STITCHING WITH DATA SCIENCE NOTEBOOKS

(71) Applicant: Adobe Inc., San Jose, CA (US)

(72) Inventors: Trevor Paulsen, Lehi, UT (US); Joshua Butikofer, Lehi, UT (US); Adrian Tanase, Ilfov (RO)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/157,019

(22) Filed: Jan. 19, 2023

(65) Prior Publication Data

US 2023/0153179 A1 May 18, 2023

Related U.S. Application Data

(63) Continuation of application No. 16/804,528, filed on Feb. 28, 2020, now Pat. No. 11,609,802.

(51) Int. Cl.
*G06F 9/54* (2006.01)
*G06F 16/23* (2019.01)

(52) U.S. Cl.
CPC .......... *G06F 9/542* (2013.01); *G06F 16/2365* (2019.01)

(58) Field of Classification Search
None
See application file for complete search history.

(56) References Cited

U.S. PATENT DOCUMENTS

| | | | |
|---|---|---|---|
| 6,748,420 B1 | 6/2004 | Quatrano et al. | |
| 10,440,009 B1 | 10/2019 | Manwiller et al. | |
| 11,609,802 B2 | 3/2023 | Paulsen et al. | |
| 2012/0233595 A1 | 9/2012 | Ghanathe et al. | |
| 2014/0358482 A1 | 12/2014 | Sehgal et al. | |
| 2019/0007509 A1 | 1/2019 | Lipka | |
| 2019/0121847 A1 | 4/2019 | Castañeda-Villagrán | |
| 2020/0106844 A1 | 4/2020 | Glommen et al. | |
| 2020/0195785 A1 | 6/2020 | Meredith et al. | |
| 2020/0257748 A1 | 8/2020 | Bellare et al. | |

OTHER PUBLICATIONS

U.S. Appl. No. 16/804,528, Final Office Action, mailed on May 5, 2021, 18 pages.
U.S. Appl. No. 16/804,528, First Action Interview Office Action Summary, mailed on Dec. 22, 2020, 6 pages.

(Continued)

*Primary Examiner* — Chat C Do
*Assistant Examiner* — William C Wood
(74) *Attorney, Agent, or Firm* — Kilpatrick Townsend & Stockton LLP

(57) ABSTRACT

This disclosure involves using data science notebooks to customize and apply a visitor stitching framework. An event management system provides an initial visitor stitching framework via a data science notebook, wherein the data science notebook is an interactive environment for managing algorithms and data. The event management system receives, from a resource provider system via the data science notebook, a modification to the initial visitor stitching framework. The event management system applies the modification to the initial visitor stitching framework to generate a custom visitor stitching framework. The event management system processes a dataset associated with the resource provider system and a user using the custom visitor stitching framework to generate a stitched dataset associated with the user.

15 Claims, 9 Drawing Sheets

(56) References Cited

OTHER PUBLICATIONS

U.S. Appl. No. 16/804,528, First Action Interview Pilot Program Pre-Interview Communication, mailed on Aug. 20, 2020, 4 pages.
U.S. Appl. No. 16/804,528, Non-Final Office Action, mailed on Apr. 1, 2022, 19 pages.
U.S. Appl. No. 16/804,528, Notice of Allowance, mailed on Oct. 21, 2022, 18 pages.

```
NOTEBOOK                                                    300
─────────────────────────────────────────────────────────────────
                    VISITOR STITCHING ALGORITHM
                                              302
```

```
In [1]:   INSERT INTO     blend_test_june
          SELECT
            e.*,
            CASE WHEN ids.user_id IS NULL THEN "e". "endUserIDs". "_experience". "aaid". "id" ELSE ids.us
  304     FROM
                  global_production_postvalues e
          LEFT JOIN (
            SELECT
              cookie_id,
              user_id,
              hit_time,                                              306
              LEAD (hit_time, 1)OVER (
                PARTITION BY cookie_id
                ORDER BY
                  hit_time
              )AS lead,
              LAG(hit_time, 1)OVER (
                PARTITION BY cookie_id
                ORDER BY
                  hit_time
              )AS lag
            FROM
                    id_map_identity
            ORDER BY
                  hit_time,
          )ids ON (
            "e". "endUserIDs". "experience". "aaid". "id" = ids.cookie_id
            AND(
              (
                e.timestamp >= ids.hit_time
                AND e.timestamp < lead
              )
              OR (
                e.timestamp < ids.hit_time
                AND lag IS NULL
              )
              OR (
                e.timestamp >= ids.hit_time
                AND lead IS NULL
              )
            )
          )
          WHERE
            ACP_MONTH = 6
            AND ACP_DAY BETWEEN 8
            AND 15
          ORDER BY
            timestamp
```

| | Timestamp | Cookie ID | User ID | Page | "Stictched" ID | |
|---|---|---|---|---|---|---|
| Out [1]: | 1 | 123 | -- | Homepage | trevor | |
| | 2 | 123 | -- | Product Detail | trevor | |
| | 3 | 123 | -- | Shopping Cart | trevor | |
| 308 | 4 | 123 | -- | Check Out | trevor | 310 |
| | 5 | 123 | trevor | Create Accnt | trevor | |
| | 6 | 123 | trevor | Purchase Page | trevor | |

| Timestamp 502 | Cookie ID 504 | User ID 506 | Page 508 |
|---|---|---|---|
| 1 502A | 123 504A | -- 506A | Homepage 508A |
| 2 502B | 123 504B | -- 506B | Product Detail 508B |
| 3 502C | 123 504C | -- 506C | Shopping Cart 508C |
| 4 502D | 123 504D | -- 506D | Check Out 508D |
| 5 502E | 123 504E | trevor 506E | Create Account 508E |
| 6 502F | 123 504F | trevor 506F | Purchase Page 508F |

| Cookie ID | User ID | Timestamp this relationship was discovered* |
|---|---|---|
| 123 504E | trevor 506E | 5 502E |

FIG. 5B

| Timestamp 522 | Cookie ID 524 | User ID 526 | Page 528 | "Stitched" ID 530 |
|---|---|---|---|---|
| 1 522A | 123 524A | -- | Homepage 528A | trevor 530A |
| 2 522B | 123 524B | -- | Product Detail 528B | trevor 530B |
| 3 522C | 123 524C | -- | Shopping Cart 528C | trevor 530C |
| 4 522D | 123 524D | -- | Check Out 528D | trevor 530D |
| 5 522E | 123 524E | trevor 526E | Create Account 528E | trevor 530E |
| 6 522F | 123 524F | trevor 526F | Purchase Page 528F | trevor 530F |

FIG. 5C

VISITOR STITCHING WITH DATA SCIENCE NOTEBOOKS

CROSS-REFERENCE TO RELATED APPLICATION

This application in a continuation application of U.S. patent application Ser. No. 16/804,528, filed Feb. 28, 2020, now allowed, the content of which is incorporated herein by reference in its entirety.

TECHNICAL FIELD

This disclosure generally relates to data analytics. More specifically, but not by way of limitation, this disclosure relates to visitor stitching using data science notebooks.

BACKGROUND

Collecting and analyzing user data is increasingly popular. A major area of focus is web analytics, which deals with the analysis of data created by website usage. For instance, web analytics can be used to mine visitor traffic data. A variety of visitor traffic data is measured such as what browser is being used, what links on a given web page were selected, whether a product was purchased, and so forth. There are number of web analytics tools presently available that capture and analyze data related to website usage.

Some existing systems "stitch" or "blend" data to tie web traffic data together with other web traffic data. Typically, data is stitched using an "off-the-shelf" product that provides little visibility. Such a product may be provided to customers in a "one-size-fits-all" fashion. Customers viewing output such as a stitched dataset or information derived from a stitched dataset do not have transparency as to how the stitching occurs. Inaccurate data may also be inadvertently used to generate the stitched dataset, corrupting the results. Further, each customer may have different needs and data peculiarities that makes a uniform approach inaccurate. For example, one customer may have call center agents login on behalf of users using the same browser for hundreds of users. This can lead to conflating the call center agent with the users, generating inaccurate results. As another example, some operations performed in stitching for one customer may be unnecessary for another customer. Without enabling customization, these unnecessary operations will nevertheless be executed, wasting time and computing resources.

Accordingly, there is a need to provide transparency and customization into the visitor stitching process. Attempts at customization include consulting with the customers and preparing custom stitching implementations based on the customers' needs. This may be done with proprietary tools or customer scripts that require specialized training. This process is expensive and time-consuming.

SUMMARY

Certain embodiments involve stitching event data using data science notebooks. For example, an event management system provides an initial visitor stitching framework via a data science notebook, wherein the data science notebook is an interactive environment for managing algorithms and data. The event management system receives, from a resource provider system via the data science notebook, a modification to the initial visitor stitching framework. The event management system applies the modification to the initial visitor stitching framework to generate a custom visitor stitching framework. The event management system processes a dataset associated with the resource provider system and a user using the custom visitor stitching framework to generate a stitched dataset associated with the user. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 3 depicts an example of a data science notebook for visitor stitching, according to certain embodiments of the present disclosure.

FIG. 5A depicts an example of an event dataset, according to certain embodiments of the present disclosure.

FIG. 5B depicts an example of an identity mapping, according to certain embodiments of the present disclosure.

FIG. 5C depicts an example of an event dataset that has been updated using the identity mapping of FIG. 5B, according to certain embodiments of the present disclosure.

DETAILED DESCRIPTION

Figure 1:
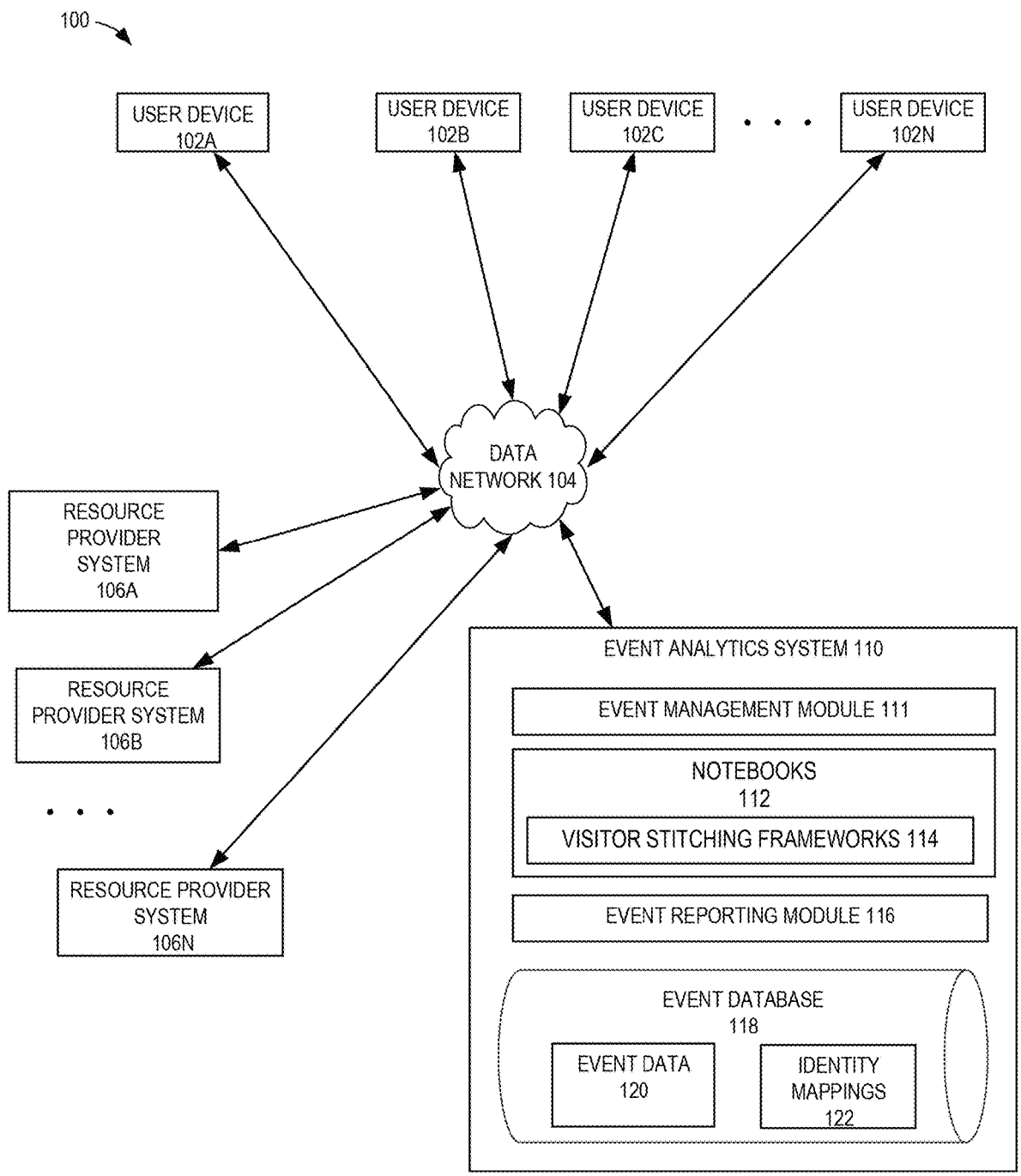
FIG. 1 depicts an example of a network environment for visitor stitching with data science notebooks, according to certain embodiments of the present disclosure.

The present disclosure includes systems and methods for visitor stitching using data science notebooks. A data science notebook is an interactive environment for managing algorithms and data. Data science notebooks are popular in the context of scientific and machine learning algorithms, but are not typically used in the context of algorithms that are repeatedly executed in a continuously running system. The present disclosure provides techniques for integrating data science notebooks into an event analytics system, and can be used to provide increased visibility and control over the stitching framework used to perform visitor stitching. As explained above, conventional solutions tend to be a one-size-fits-all approach, and do not provide functionality to customize a visitor stitching framework at all, or without expensive and time-consuming consultations. Without transparency into, and control over, the visitor stitching framework, problems can arise such as inaccurate results or repeatedly running algorithms that require an excessive amount of computational resources. Certain embodiments described herein improve the performance of stitching systems by using data science notebooks to customize stitching frameworks used for different resource providers. For example, event analytics systems described herein are used to generate a stitched dataset associated with a user using a custom visitor stitching framework. The event management system provides an initial visitor stitching framework to a resource provider via a data science notebook, and receives a modification to the initial visitor stitching framework via the data science notebook. The event analytics system uses the modification to generate the custom visitor stitching framework to use to stich user data in a tailored fashion. Accordingly, the resource provider can have visibility and control over the stitching framework via the data science notebook, and the stitching can be performed with improved computational efficiency over the one-size-fits-all approach of prior techniques.

The following non-limiting example is provided to introduce certain embodiments. In this example, an event analytics system includes one or more computing systems that execute an event management module and a data science notebook. The event management module generates an initial visitor stitching framework. The initial visitor stitching framework includes code for "stitching" user data by correlating events associated with an anonymous device identifier with a particular user. The initial visitor stitching framework may further include code for collecting user data from various user devices and organizing the user data into an event dataset.

The event management system provides the initial visitor stitching framework to a resource provider system. The resource provider is an entity such as a merchant that seeks to collect and/or analyze user data to inform future interactions with the user. The event management system provides the initial visitor stitching framework via a data science notebook. The data science notebook is an interactive environment for managing algorithms and data. The data science notebook organizes code, results, and notes about the visitor stitching framework so that an administrator of the resource provider system can evaluate the initial visitor stitching framework and make any changes desired to the initial visitor stitching framework.

The event management system then receives, from the resource provider system via the data science notebook, a modification to the initial visitor stitching framework. Modifications include providing shortcuts to data sources, adding or removing data sources, adding code (e.g., as a plug-in), and removing portions of code. As examples of the latter, certain stitching steps may be unnecessary for certain resource providers. For example, the stitching framework may include functionality to stitch data from a single device to multiple users. However, this may not apply to a given resource provider (e.g., because users are exclusively assigned a device for interactions with the resource provider). Accordingly, the data science notebook may be used to customize a stitching framework in a user-friendly fashion.

The event management system applies the modification to the initial visitor stitching framework to generate a custom visitor stitching framework. The event management system may finalize the changes made in the data science notebook, and make any additional changes needed to make the custom visitor stitching framework run smoothly based on the criteria received from the resource provider system.

Subsequently, the event management system gathers data associated with the resource provider system and a particular user. Such data may correspond to user actions on a website of the resource provider system, as well as user interactions with call center operators and in-person representatives of the resource provider system. The event management system compiles such data into a dataset associated with the resource provider system and the user.

The event management system processes the dataset using the custom visitor stitching framework to generate a stitched dataset associated with the user. Based on the criteria received from the resource provider system, the event management system stitches event data by adding a user identifier to the event data. This results in a stitched event dataset that is correlated with the user. Based on the modifications indicated via the data science notebook, data can be quickly retrieved from the appropriate sources, and unnecessary computation can be omitted. This can result in more efficient and accurate visitor stitching.

As used herein, the term "event" is used to refer to an occurrence that may be associated with a user. Events may include detection of a user interaction with a website or application. For example, a user may click on a link, enter information, open an email, send an email, and so forth. Events may include in-person interactions. For example, a user may make an in-store purchase or return, or speak face-to-face with a representative. Events may include remote interactions with a representative such as a conversation with a call-center operator or a dialogue with a chatbot.

As used herein, the term "event data" is used to refer to data associated with an event. Event data may include a timestamp, device identifier, user identifier, website information, product information, an email address, a phone number, and/or any other suitable information.

As used herein, the term "visitor stitching" is used to refer to a process by which several distinct events (e.g., visits to a website) associated the same person are combined or otherwise associated with one another for analytical purposes. For instance, if a particular person visits a website multiple times using the same browser, each of those visits can be associated with the same person using cookies stored by the browser. More complex forms of visitor stitching may correlate events associated with a user across multiple browsers and devices. The analytics associated with a given person can then be converted into actionable intelligence, for example, in the context of a marketing strategy.

As used herein, the term "visitor stitching framework" is used to refer to techniques for performing visitor stitching. A visitor stitching framework may include algorithms for gathering event data from various sources. A visitor stitching framework may include algorithms for stitching event data to a particular user by linking data from one or more devices or browsers to a user identifier.

As used herein, the term "data science notebook" or "notebook" is used to refer to an interactive environment for managing algorithms and data. A data science notebook may include interface elements for configuring algorithms. For example, a data science notebook may include functionality to accept input specifying a plugin that adds new components and integrates with existing code. A data science notebook may include functionality to accept input establishing code in custom chunks that can be executed one at a time in a user-friendly fashion. In some embodiments, a data science notebook includes supplementary features such as display of the output of an algorithm, comments, pictures, and visualizations. An example of a data science notebook is a Jupyter notebook, an open-source, web-based, data science notebook (jupyter.org).

As used herein, the term "device identifier" is used to refer to an identifier associated with a particular device. An example of a device identifier is a cookie identifier, which is a unique identifier used to recognize a browser. Examples of device identifiers include an Experience Cloud Identifier (ECID), an Audience Manager unique user identifier (AAMUUID), and an Adobe Analytics identifier (AAID). Another example of a device identifier is a universally unique identifier (QUID). Another example of a device identifier is an internet protocol (IP) address.

As used herein, the term "user identifier" is used to refer to an identifier of a user, such as a customer or potential customer. A user identifier may include a string of characters. Examples of user identifiers include a login identifier, a customer relationship management (CRM) identifier, an email address, a phone number, and a legal name.

As used herein, the term "identity mapping" is used to refer to a mapping between a device identifier and a user identifier. In some embodiments, an identity mapping may further include a timestamp representing a time at which the relationship between the device identifier and the user identifier was discovered. Such identity mappings can be used to stitch event data as described herein.

Certain embodiments described herein facilitate using event data to analyze the behavior of user. In some embodiments, the user behaviors are used to take appropriate action in response to a certain event (e.g., transmitting a sale email to a user after prior user behavior indicates the user has made a purchase after receiving a similar email). The use of data science notebooks to customize a visitor stitching framework enables efficiently tailoring the visitor stitching to the situation, which can provide more accurate and fast results.

Example Operating Environment for Stitching Event Data Using Data Science Notebooks Referring now to the drawings, FIG. 1 depicts an example of a network environment 100 for stitching event data using data science notebooks, according to certain embodiments of the present disclosure. In the example depicted in FIG. 1, various user devices 102A, 102B, 102C, ... 102N access resource provider systems 106A, 106B, ... 106N via a data network 104. An event analytics system 110 analyzes events associated with the user devices 102A-102N using visitor stitching frameworks 114, notebooks 112, an event management module 111, and an event reporting module 116 (or other suitable program code) for performing one or more functions used in visitor stitching based on event data 120 in an event database 118.

Event data 120 can be used for analyzing behavior of an end user, such as a consumer, based on events associated with the user. In a non-limiting example, event data 120 includes records such as browser history (e.g., based on detecting a user clicking on a link, adding an item to a cart, purchasing an item, navigating to a page, and so forth). Event data 120 may further be associated with email exchanges, transcripts of phone calls, or in-store transactions such as a purchase or return. Event analytics system 110 uses the event data 120 to manage event datasets for analyzing correlated events, such as the behavior of a particular user over time. The event analytics system 110 correlates the events using visitor stitching frameworks 114, which can be customized and evaluated using notebooks 112.

Some embodiments of the network environment 100 include user devices 102A-102N. Examples of a user device include, but are not limited to, a personal computer, a tablet computer, a desktop computer, a processing unit, any combination of these devices, or any other suitable device having one or more processors. A user of the user device (e.g., 102A, 102B, 102C, or 102N) interacts with one or more resource provider systems (e.g., 106A, 106B, or 106N), directly or indirectly, via the data network 104.

The resource provider systems 106A-106N include one or more computers controlled by a resource provider. A resource provider may be as a merchant, transit provider, content provider, or any entity that can utilize event data. The resource provider systems 106A-106N may each include a server computer that serves data for a website accessed by user devices 102A-102N. The resource provider systems 106A-106N may include one or more point of sale (POS) terminals that process in-store purchases. The resource provider systems 106A-106N may include call center computers that collect and store records of calls between users and customer service representatives. The resource provider systems 106A-106N may include one or more server computers that analyze and store user data (e.g., a customer relationship management (CRM) system). Alternatively, or additionally, the resource provider systems 106A-106N may interact with a third-party CRM service. By way of such components, the resource provider systems 106A-106N may generate, collect, and/or store event data. The resource provider systems 106A-106N may further include one or more displays (e.g., monitors, touchscreens, and the like) for displaying event data or derivatives thereof.

Each of the user devices 102A-102N is communicatively coupled to one or more resource provider systems 106A-106N and the event analytics system 110 via the data network 104. Examples of the data network 104 include, but are not limited to, internet, local area network ("LAN"), wireless area network, wired area network, wide area network, and the like.

The event analytics system 110 includes an event database 118. The event database 118 can be implemented as one or more databases or one or more data servers. The event database 118 includes event data 120. Event data 120 may be used by the visitor stitching frameworks 114 and event reporting module 116 of the event analytics system 110 to generate a stitched dataset. The event analytics system 110 may further store identity mappings 122 to the event database 118, which can be used to stitch the event data 120, as described in further detail below with respect to FIG. 2.

Figure 8:
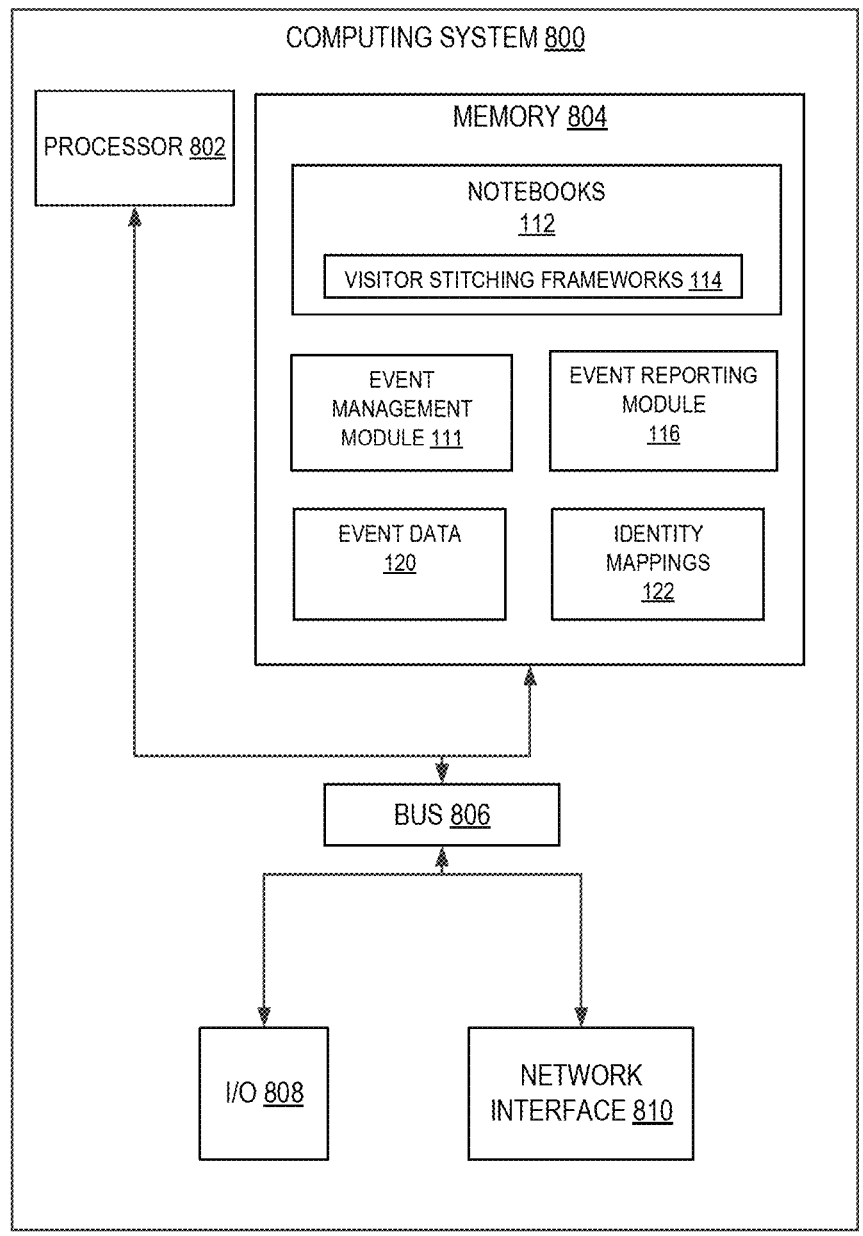
FIG. 8 depicts an example of a computing system that performs certain operations described herein, according to certain embodiments of the present disclosure.

The event management module 111 includes code configured to, in cooperation with a processor (e.g., as shown in FIG. 8), gather, generate, store, and update event data. The event management module 111 may collect event data 120 from user devices 102A-102N and/or resource provider systems 106A-106N. The event management module 111 may further generate event data 120. For example, the event management module 111 may generate a timestamp based on a time that event data 120 was retrieved from a user device.

The event management module 111 may analyze event data 120 to identify common elements (e.g., a device identifier). The event management module 111 may organize event data 120 into event datasets based on such common elements. For example, the event management module 111 may organize event data 120 into a data table, correlate related event data 120 using pointers, or any other suitable means of organizing the event data 120.

The visitor stitching frameworks 114 include various sets of code. Each resource provider 116A, 116B, ... 116N may be associated with one or more visitor stitching frameworks. The visitor stitching frameworks 114 may be customizable to suit the needs of a given resource provider.

A visitor stitching framework 114 may include code configured to, in cooperation with a processor (e.g., as shown in FIG. 8), perform visitor stitching of event data 120. The visitor stitching frameworks 114 may include functionality to update event datasets by adding or modifying fields of an event dataset. For example, upon identifying a user identifier, the visitor stitching frameworks 114 may update fields of an event dataset to include the user identifier. The visitor stitching frameworks 114 may further include functionality to update event datasets by adding data corresponding to new events.

In some embodiments, a visitor stitching framework 114 may generate identity mappings 122 based on event data 120. The visitor stitching framework 114 may generate and store an identity mapping 122 by storing a user identifier in association with a device identifier. The visitor stitching framework 114 may further store a time at which the relationship between the user identifier and the device identifier was discovered as part of the identity mapping 122. In some embodiments, the visitor stitching framework 114 may maintain an identity mapping 122 with multiple user identifiers that correspond to a particular user (e.g., a phone number and a username).

The notebooks 112 include code configured to, in cooperation with a processor (e.g., as shown in FIG. 8), facilitate customization and analysis of visitor stitching frameworks 114. The notebooks 112 may, for example, receive input from a resource provider computer (e.g., 106A, 106B, . . . 106N) to modify a visitor stitching framework 114. The notebooks 112 may further include functionality to display information about a visitor stitching framework 114 to resource providers 106A-106N (e.g., as illustrated in FIG. 3).

Figure 6:
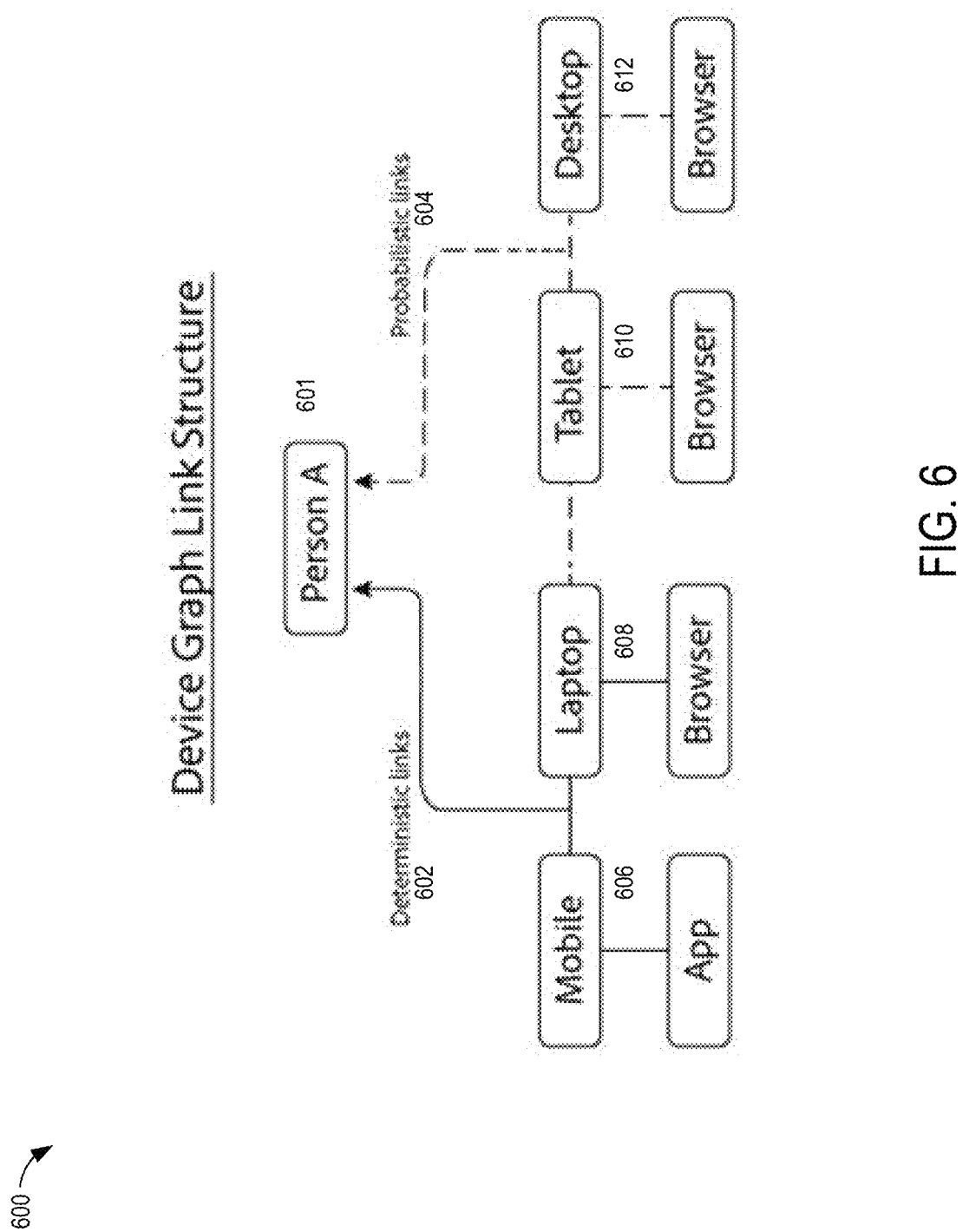
FIG. 6 depicts an example of a device graph, according to certain embodiments of the present disclosure.
Figure 7:
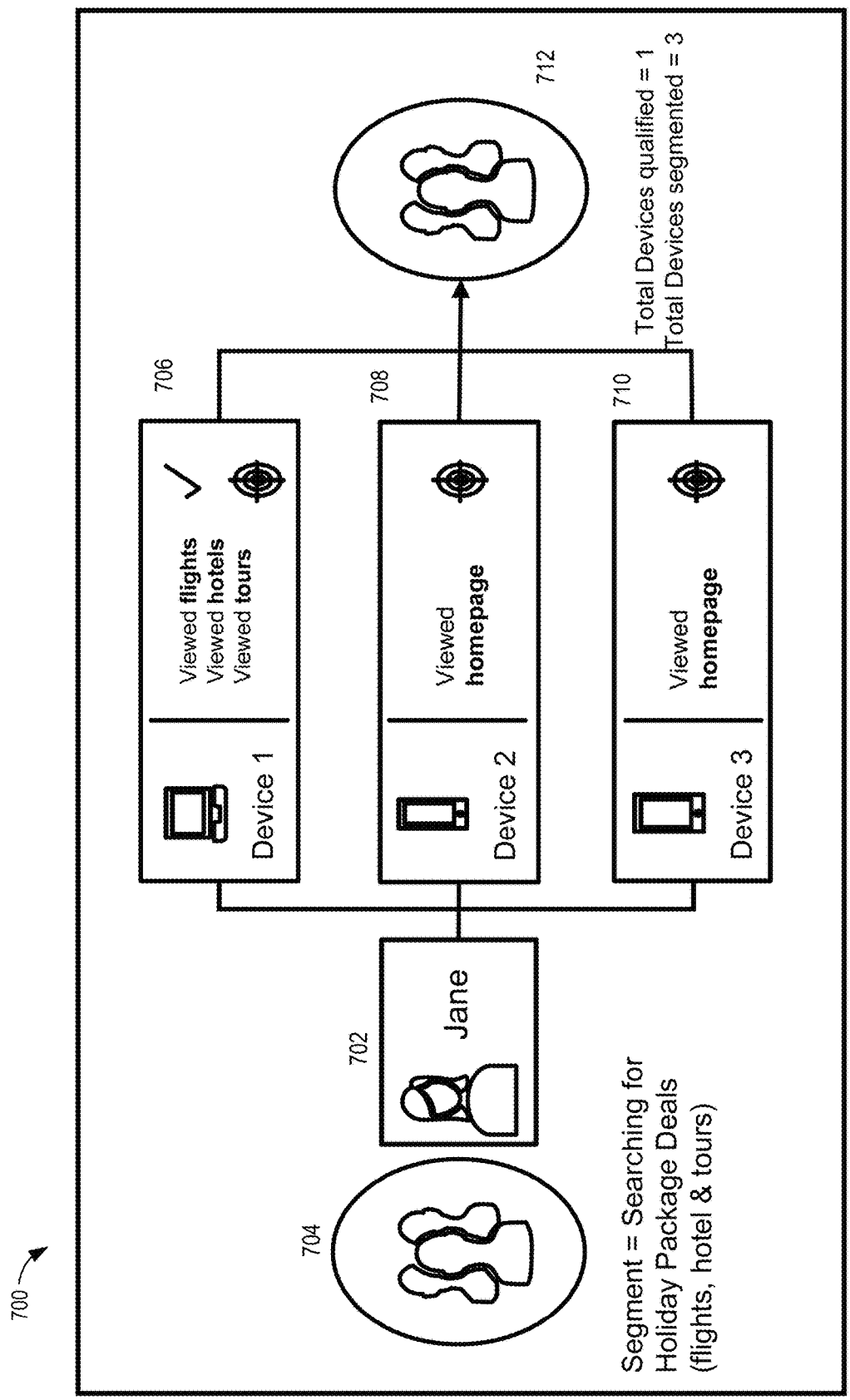
FIG. 7 depicts another example of a device graph, according to certain embodiments of the present disclosure.

The event reporting module 116 includes code configured to, in cooperation with a processor (e.g., as shown in FIG. 8), generate and provide event-related reports. The event reporting module 116 may, for example, convert an event dataset into a visual representation and cause display of the representation to an administrator via resource provider system 106A-106N. The event reporting module 116 may include functionality to generate a device graph for display, e.g., as illustrated in FIGS. 6 and 7.

Examples of Operations for Stitching Event Data Using Data Science Notebooks

Figure 2:
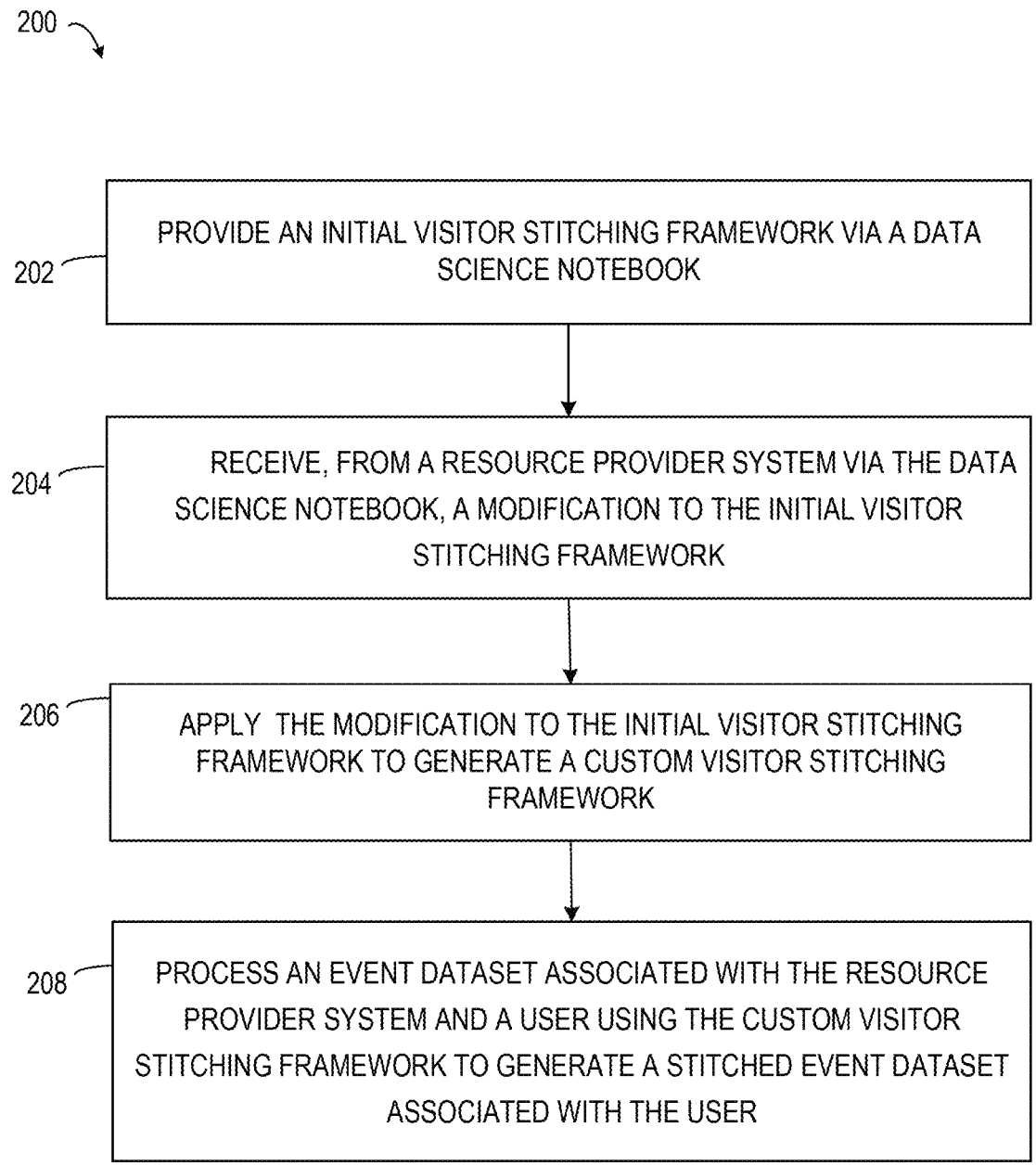
FIG. 2 depicts an example of a process for visitor stitching with data science notebooks, according to certain embodiments of the present disclosure.

FIG. 2 depicts an example of a process 200 for stitching event data using data science notebooks, according to certain embodiments of the present disclosure. The processing depicted in FIG. 2 may be implemented in software only (e.g., code, instructions, program) executed by one or more processing units (e.g., processors, cores) of the respective systems, in hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 2 may be performed by the event analytics system 110 in cooperation with other devices as illustrated in FIG. 1.

At step 202, the event analytics system provides an initial visitor stitching framework via a data science notebook. The data science notebook is an interactive environment for managing algorithms and data. The event analytics system may establish elements to display in a data science notebook as illustrated in FIG. 3. The event analytics system may cause display of the data science notebook on a display element in the resource provider system. The elements displayed via the data science notebook include the initial visitor stitching framework, and may further include an example of output of the initial visitor stitching framework, notes and explanatory text, and other information useful for interpreting the initial visitor stitching framework.

The initial visitor stitching framework may include code for stitching event data to a user. In some embodiments, the initial visitor stitching framework is in Structured Query Language (SQL), which is relatively widely adopted and easy to understand. As other examples, popular programming languages and frameworks such as Java, Spark, Scala, Python, and R may be implemented. In contrast, visitor stitching algorithms are often in proprietary or complex languages, and may be difficult for a resource provider administrator to understand. The initial visitor stitching framework may include code for gathering event data as well as code for stitching event data in a particular way.

In some embodiments, the event analytics system may provide multiple stitching algorithms via the notebook. For example, the event analytics system may cause display of interface elements that can be used to choose different templates of stitching algorithms, which the resource provider administrator can view and modify.

At step 204, the event analytics system receives, from a resource provider system via the data science notebook, a modification to the initial visitor stitching framework. The notebook may be configured to accept user input, and, responsive to such user input, modifications may be transmitted from the resource provider system to the event analytics system. The modification may include changing parts of the framework (e.g., obtain event data from a particular source or give precedence to one type of user identifier over another type of user identifier). The modification may include omitting parts of the initial stitching framework (e.g., removing parts of a stitching algorithm). For example, some aspects of the initial stitching framework may be useful to some resource providers but not others. Examples of aspects of an initial stitching framework that may not be needed by certain resource providers include mapping multiple users to one device and mapping one user to multiple devices, as further described below with respect to step 208.

Modifying the initial stitching framework may include adding code (e.g., by providing a plug-in via the notebook). The event analytics system may receive a plugin to execute with the initial visitor stitching framework. As an example, for a particular resource provider, call center agents log in on behalf of users. This can pollute the identity data used by the stitching algorithm, as events associated with a user identifier are not necessarily associated with the corresponding user. Via the data science notebook, the resource provider administrator may provide a way to account for this by adding custom filtration code (e.g., excluding data from the stitching process if the data is tied to a particular set of device identifiers and/or IP addresses).

In some embodiments, the event analytics system may manage different custom visitor stitching frameworks for different resource providers (e.g., resource provider system 106A, resource provider system 106B, . . . resource provider system 106N, as illustrated in FIG. 1). In some embodiments, a particular resource provider may further establish different stitching algorithms to use for different use cases. This may be achieved by presenting a configuration menu prior to or along with the notebook. For example, a resource provider may be presented with a drop-down menu to select a location, thereby configuring a visitor stitching framework for a particular location.

At step 206, the event analytics system applies the modification to the initial visitor stitching framework to generate a custom visitor stitching framework. The event analytics system may add, remove, or modify, portions of the algorithm (e.g., code portions) to be used to stitch event data for the resource provider, based on the modification(s) received at step 204.

The event analytics system may modify the visitor stitching framework so that it runs smoothly with the modifications made. The result is a custom visitor stitching framework which can be used for some or all of the stitching done for the resource provider from which the modification was received.

At step 208, the event analytics system processes an event data set associated with the resource provider system and a user using the custom visitor stitching framework to generate a stitched event dataset associated with the user. The event analytics system may implement the modified visitor stitching framework to perform visitor stitching. For example, if the modification was to remove portions of code from the initial visitor stitching framework, then the event analytics system executes the custom visitor stitching framework without executing the removed code portions. The event analytics system may gather event data, store event data, and process event data in order to generate an event dataset and stich the event dataset to correlate events with a particular user.

Gathering the event data may include identifying event data for events associated with a user. The event data for each event may include a timestamp and a device identifier. The event data may further include additional elements, such as a website identifier, location information, or any other suitable information. Identifying the event data may include retrieving event data from a user device and/or a resource provider device. Alternatively, or additionally, identifying the event data may include generating event data. For example, the event analytics system may retrieve browsing data from a user device and generate a timestamp indicating a time at which the browsing data was retrieved.

The event analytics system may generate and store an event dataset including the event data. The event analytics system may store a set of timestamps, a set of device identifiers, and/or other data elements in association with one another to produce the event dataset. The event analytics system may, for example, generate the event dataset by storing each event data element to an entry in a data table, e.g., as illustrated in FIG. 5A. Some event data collected may be anonymous (e.g., not include a user identifier). Some event data may include a user identifier, and such event data can be used to perform visitor stitching.

In some embodiments, the event analytics system generates an identity mapping that maps the device identifier to the user identifier. The event analytics system may store the identity mapping. The event analytics system may generate the identity mapping by storing the device identifier in association with the user identifier (e.g., as a data table or using a pointer). The identity mapping may further include a timestamp indicating a time at which the relationship between the user identifier and the device identifier was discovered. An example of such an identity mapping is shown in FIG. 5B.

In some embodiments, the event analytics system may generate the identity mapping by querying the event dataset. The event dataset is scanned either in its entirety, or back to a suitable time frame to limit the computational effort needed to create the identity mapping. Events may be filtered where the device identifier and the user identifier are present (a.k.a. authenticated rows). The event analytics system may group the event dataset by the device identifier, and then check to see if the user identifier is a new assignment (no previous rows), the same assignment (preceded by rows with the same user identifier), or a change in assignment (the immediately preceding row has a different user identifier). In the cases of a new or changed assignment, a new identity mapping is recorded, along with the event timestamp of the row, forming a tuple of (timestamp, device identifier, user identifier). This process may be repeated for a set of stored device identifiers, and new mappings may be saved to a new identity mapping dataset. In some embodiments, the identity mapping datasets are partitioned by time.

The event analytics system may use the generated identity mapping to update the event dataset based on the identity mapping and a predetermined look-back window. The event analytics system may update the event dataset by adding the user identifier to the event dataset (e.g., by adding or modifying fields in the event dataset). In some embodiments, the event analytics system adds the user identifier to the event dataset by performing a left join of the identity mapping and the event dataset. An example of updating the event dataset to include the user identifier using the event mapping is illustrated in FIGS. 5A-5C, where a new column (530A-530F) with the user identifier has been added to the event dataset. Alternatively, or additionally, preexisting fields of the event dataset may be modified to include the user identifier in the identity mapping. For example, referring to FIG. 5C, the User ID fields 526A-526F can be modified to include the discovered user identifier.

In some embodiments, the event analytics system updates the event dataset asynchronously to generating and storing the event data. The event analytics system may identify a stored look-back window of, for example, one week. The event analytics system may locate event data which was gathered and stored within the last week by comparing the look-back window and the current date and time to the timestamps in the event dataset. The generating, storing, and appending data to the event dataset may be executed substantially in real time, while the asynchronous update occurs at a later time based on the look-back window. Accordingly, the identity mapping may be generated and updated to add additional event data on an ongoing basis, while breaking down stitching updates into relatively small batches that are relatively quick to process.

In some embodiments, the event analytics system correlates one device to multiple users. For example, multiple users may share a device. The event analytics system may generate an identity mapping of a device identifier to a first user identifier as described above, and subsequently identify event data that includes the device identifier and a second user identifier. The event analytics system updates the identity mapping to reflect the second user identifier. If the event analytics system thereafter receives additional event data including the device identifier, without a user identifier, then the event analytics system may stitch the event data to include the second user identifier. In some embodiments, the most recent user identifier may be used to stitch the event data, based on timestamps. Alternatively, or additionally, probabilistic factors may be taken into account, as described below with respect to FIG. 6.

In some embodiments, the event analytics system correlates one user to multiple devices. For example, a particular user may interact with a website on both a mobile phone and a computer. The event analytics system may generate an identity mapping of a device identifier to a first user identifier as described above, and subsequently identify event data that includes the user identifier and a second device identifier. The event analytics system updates the identity mapping to reflect the second device identifier. If the event analytics system thereafter receives additional event data including the second device identifier, without a user identifier, then the event analytics system may stitch the event data to include the user identifier.

In some embodiments, after generating and applying a customized visitor stitching framework for a first resource provider, the event analytics system generates and applies a second visitor stitching framework for a second resource provider. In particular, steps 202-208 are executed, wherein the resource provider system is a first resource provider system, the modification is a first modification, the custom visitor stitching framework is a first custom visitor stitching framework, the stitched dataset is a first stitched dataset, and the user is a first user. The event management system thereafter receives, from a second resource provider system, a second modification to the initial visitor stitching framework. For example, a first modification was received from a first resource provider system removing a module from the visitor stitching framework, and a second modification is received from a second resource provider system adding a plugin to the visitor stitching framework. The event management system applies the second modification to the initial visitor stitching framework to generate a second custom visitor stitching framework. The event management system processes a second dataset associated with the second resource provider system and a second user using the second custom visitor stitching framework to generate a second stitched dataset associated with the second user. For example, the event management system may repeat step 208, but using data from different sources and associated with a second user, using the second custom visitor stitching framework.

In some embodiments, after step 208, the event analytics system generates a device graph associating the user with a plurality of user devices. A device graph maps a set of user identifiers to a set of devices. The device graph may further associate those devices with a person or household. The device graph can provide a resource provider a complete understanding of users' devices, which can be used create customized and consistent experiences for every interaction. The device graph may be in tabular form (e.g., similar to FIG. 5C, but potentially with additional user identifiers and device identifiers). Alternatively, or additionally, the device graph may be in graphical form (e.g., as illustrated in FIGS. 6 and 7). Device graphs are described in further detail below with respect to FIGS. 6 and 7.

The event management system may provide data for display of the device graph to the resource provider system. The event management system thereby causes the resource provider system to display the device graph on a display component of the resource provider system. In some embodiments, the event analytics system may generate a visualization of the device graph—for example, by generating instructions for rendering a chart or graph illustrating the device graph or a derivative thereof. The event analytics system may provide information for display of the visualization of the device graph to the resource provider computer. For example, the event analytics system transmits the instructions for rendering the visualization of the device graph to the resource provider computer over a network. By transmitting the instructions for rendering the visualization of the device graph to the resource provider system, the event analytics system may cause the resource provider computer to display the visualization of the device graph on a display component of the resource provider system.

FIG. 3 depicts an example of a data science notebook 300 for visitor stitching, according to certain embodiments of the present disclosure. The data science notebook 300 displays one or more modules of code (e.g., input 304), along with corresponding output (e.g., output 308). In some embodiments, data science notebook 300 may include additional features such as pictures (e.g., to explain the visitor stitching framework 306 and output thereof), drop-down menus, and radio buttons (not pictured).

The data science notebook 300 includes explanatory text 302. In this example, the explanatory text 302 explains that the code below is a visitor stitching algorithm. In some cases, explanatory text may include further detail as to what particular portions of the code are designed to achieve, the context of the visitor stitching algorithm, and so forth.

The data science notebook 300 displays a visitor stitching framework 306 as the input 304. The visitor stitching framework 306 is displayed so that it can be modified via received user input. For example, a user can click on the code and modify the code. In some embodiments, the data science notebook 300 may further include interface elements such as cut, paste, edit, and add module, to further assist in receiving user modifications.

The data science notebook 300 displays a stitched dataset 310 as the output 308. Responsive to received user input to do so (e.g., selection of an enter key or run button), the data science notebook 300 may execute the visitor stitching framework 306 (with or without modifications). The results of executing the visitor stitching framework 306 on a dataset are displayed, to allow greater transparency into the visitor stitching framework 306.

In some embodiments, the notebook code is executed automatically. For example, the notebook code is scheduled to execute periodically (e.g., daily, weekly, or monthly). As another example, the notebook code is scheduled to execute in response to external events (e.g., acquisition of new event data).

Figure 4:
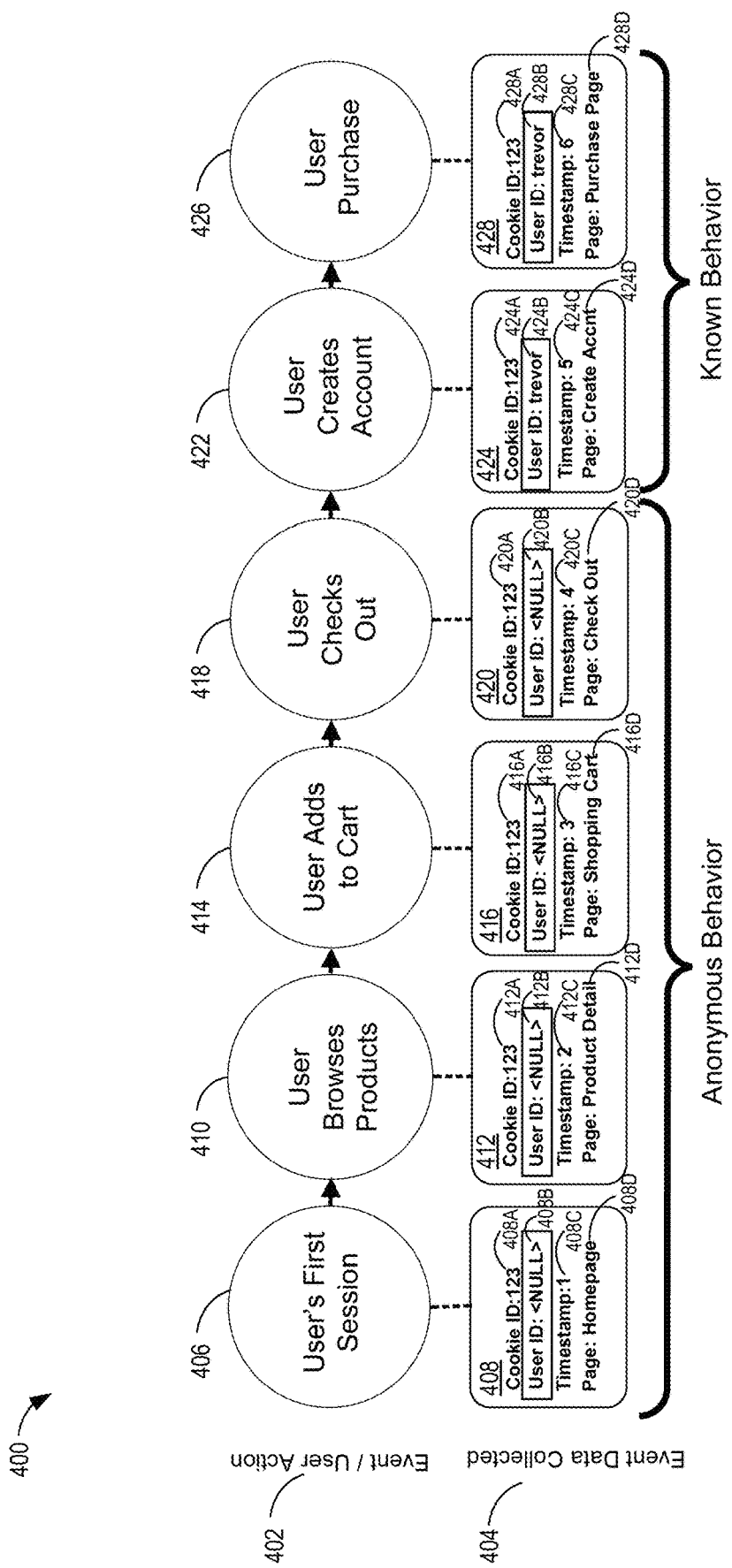
FIG. 4 depicts a schematic overview of an example of event data used for event analytics, according to certain embodiments of the present disclosure.

FIG. 4 depicts a schematic overview 400 of event data used for generating an event dataset, according to certain embodiments of the present disclosure. Each event 402 corresponds to a user action. Event data 404 is collected for each event 402.

The first event 406 corresponds to a user initiating a first session using a particular website on a particular browser. The event analytics system gathers first event data 408 corresponding to first event 406. The first event data includes a cookie identifier (ID) 408A (e.g., a type of device identifier). The first event data further includes a user ID 408B, a timestamp 408C, and a page identifier 408D. The cookie ID 408A is 123. The user ID 408B is >NULL> (e.g., there is no known user ID). The timestamp 408C is 1. The page identifier 408D is Homepage. The first event data 408 corresponds to anonymous behavior, as the user ID is null and the cookie ID is anonymous.

The second event 410 corresponds to the user browsing products on the same website and browser. The event analytics system gathers second event data 412. The second event data includes a cookie ID 412A, a user ID 412B, a timestamp 412C, and a page identifier 412D. The cookie ID 412A is 123. The user ID 412B is <NULL>. The timestamp 412C is 2. The page identifier 412D is Product Detail. The second event data 412 corresponds to anonymous behavior, as the user ID is null and the cookie ID is anonymous.

The third event 414 corresponds to the user adding items to a cart on the same website and browser. The event analytics system gathers third event data 416. The second event data includes a cookie ID 416A, a user ID 416B, a timestamp 416C, and a page identifier 416D. The cookie ID 416A is 123. The user ID 416B is NULL>. The timestamp 416C is 3. The page identifier 412D is Shopping Cart. The third event data 416 corresponds to anonymous behavior, as the user ID is null and the cookie ID is anonymous.

The fourth event 418 corresponds to the user checking out on the same website and browser. The event analytics system gathers fourth event data 420. The fourth event data includes a cookie ID 420A, a user ID 420B, a timestamp 420C, and a page identifier 420D. The cookie ID 420A is 123. The user ID 420B is NULL>. The timestamp 420C is 4. The page identifier 420D is Check Out. The fourth event data 420 corresponds to anonymous behavior, as the user ID is null and the cookie ID is anonymous.

The fifth event 422 corresponds to the user creating an account on the same website and browser. The event analytics system gathers fifth event data 424. The fifth event data includes a cookie ID 424A, a user ID 424B, a timestamp 424C, and a page identifier 424D. The cookie ID 424A is 123. The user ID 424B is trevor. The timestamp 424C is 5. The page identifier 424D is Create Acct. The fifth event data 424 corresponds to known behavior, as the user ID is now specified, identifying the user.

The sixth event 426 corresponds to the user making a purchase on the same website and browser. The event analytics system gathers sixth event data 428. The sixth event data 428 includes a cookie ID 428A, a user ID 428B, a timestamp 428C, and a page identifier 428D. The cookie ID 428A is 123. The user ID 428B is trevor. The timestamp 428C is 6. The page identifier 428D is Purchase Page. The sixth event data 428 corresponds to known behavior, as the user ID is now specified, identifying the user.

FIGS. 5A-5C depict examples of event datasets and identity mappings, according to certain embodiments of the present disclosure. FIG. 5A depicts an initial event dataset 500 containing data associated with both anonymous behavior and behavior linked to a particular user. FIG. 5B depicts an identity mapping 510 that can be used to stich or blend the initial event dataset 500. FIG. 5C depicts an updated event dataset 520 after the stitching has occurred.

Referring now to FIG. 5A, an event dataset 500 is in the form of a data table including four columns. The first column corresponds to timestamps 502 for a set of events. The second column corresponds to cookie identifiers 504 for the set of events. The third column corresponds to user identifiers 506 for the set of events. The fourth column corresponds to page identifiers 508 for the set of events.

The timestamps 502A-502F represent the times at which the respective events occurred. The cookie identifiers 504A-504F identify a device associated with the event. In this example, the cookie identifiers 504A-504F are all the same (123). The page identifiers 508A-508F represent pages associated with the events.

The first four events have blank user identifier fields 506A-506B. For these events, the cookie identifiers 504A-504D have not been associated with a particular user identifier, and the data is anonymous. The final two events have known user identifiers 506E and 506F. For the final two events, the user ID, trevor, has been identified (e.g., by the user logging in to an account). The event data for these final events has been added to the event dataset 500 along with the user identifiers 506E and 506F.

Referring now to FIG. 5B, an example of an identity mapping 510 is shown. The identity mapping 510 maps a cookie identifier 504E to a user identifier 506E. The identity mapping 510 further includes a timestamp at which the relationship was discovered. The elements of the identity mapping 510 of FIG. 5B correspond to the fifth event in the event dataset 500 of FIG. 5A. This is the point at which the relationship between the user ID trevor and the cookie ID 123 has been discovered 502E. This relationship can be used to perform user stitching using the identity mapping 510, as further detailed below with respect to FIG. 5. The timestamp corresponding to discovering the relationship 502E (e.g., 5 in this example) may be particularly useful if a device identifier is associated with different users at different times, as occurs in the case described below with respect to FIG. 6.

Referring now to FIG. 5C, the updated event dataset 520 illustrates an updated version of the event dataset 500 of FIG. 5A after performing user stitching using the identity mapping 510 illustrated in FIG. 5B.

Similarly to the event dataset 500 of FIG. 5A, the updated event dataset 520 of FIG. 5C includes a timestamp column 522, a cookie ID column 524, a user ID column 526, and a page identifier column 528. The updated event dataset 520 further includes an additional column for the "stitched" ID 530. In the "stitched" ID column 530, each entry specifies the user ID trevor discovered at timestamp S. The event analytics system has added the column specifying the user ID trevor for each entry, including those with timestamps 1-5 which were previously not associated with a user ID.

FIG. 6 depicts an example of a device graph 600, according to certain embodiments of the present disclosure. The device graph 600 establishes links 602, 604 between devices 606, 608, 610, and 612 and a user 601, "Person A."

The devices include a mobile device 606, on which the user 601 interacts with a mobile app, a laptop 608, on which the user 601 interacts with a browser 608, a tablet 610, on which the user interacts with a browser, and a desktop computer 612, on which the user interacts with a browser.

The links include deterministic links 602 and probabilistic links 604. A deterministic link 602 associates a device to a person, which may be accomplished by mapping a device identifier to a user identifier, as described above with respect to FIGS. 2-5. In some embodiments, the user identifier is anonymized (e.g., by hashing or otherwise obfuscating the user identifier).

A probabilistic link 604 connects a device to a person algorithmically based on characteristics and metadata such as browsing behavior, IP address, and operating systems. For example, a user may access a particular website through tablet 610 and desktop computer 612, without logging in and providing a user identifier. Based on the shared IP address, the event analytics system may determine that the same person is likely accessing the website through the tablet 610 and the desktop computer 612.

FIG. 7 depicts another example of a device graph 700, according to certain embodiments of the present disclosure. The device graph includes a user 702 (Jane), a segment 704, devices 706, 708, and 710, and summary 712. The devices are device 1 706, a laptop; device 2 708, a mobile phone; and device 3 708, a tablet.

User 702 uses three different devices to browse websites. User 702 is selected for event analytics as a member of segment 704. Segment 704 is a group of users searching for holiday package deals. These users searched for flights, hotels, and tours.

User 702 uses device 1 706 to view flights, hotels and tours. User 702 uses device 2 708 to view a homepage of a travel site. User 702 also uses device 3 710 to view the homepage of the travel site. Using the techniques described herein, the event analytics system can apply a custom visitor stitching framework to stich a user identifier uniquely identifying user 702 to the event data associated with each of devices 706, 708, and 710.

Device graph 700 specifies the devices 706, 708, 710 connected to user 702 in segment 704. The device graph can be used to segment authenticated and/or authenticated visitors at the individual and household level. This device graph 700 can further be used to customize device targeting to a user and/or segment. Summary 712 indicates that one device is qualified and three devices are segmented. Qualifying for segment 704 requires searching for flights, hotels and tours. Accordingly, user activity on device 1 706 qualifies for the segment (but not user activity on device 2 708 or device 3 710). By stitching the user to three devices 706, 708, and 710, the event analytics system can apply the segment to devices 2 and 3, in addition to qualifying device 1 706. Accordingly, more event data can be correlated to user 702. Further, more opportunities are provided to take targeted action to improve the browsing experience for user 702.

By providing data science notebooks to customize stitching frameworks, the resource provider can have visibility and control over the stitching framework via the data science notebook, and the stitching can be performed with improved computational efficiency over the one-size-fits-all approach of prior techniques. For example, resource providers can provide modifications, via the data science notebook, based on known shortcuts for data-gathering, reducing the amount of messaging and computation required to gather event data. As another example, resource providers can provide modifications, via the data science notebook, to remove portions of code that are unnecessary (e.g., splitting a device identifier to different users may be inapplicable in some contexts). Additional improvements are provided by allowing the resource providers to modify the stitching frameworks directly, via the data science notebook, rather than going through expensive and time-consuming consulting processes.

Embodiments use popular programming languages and frameworks such as SQL, Java, Spark, Scala, Python, and R, as opposed to proprietary software and customer scripting (which can be difficult to set up and maintain). Using popular programming languages and frameworks allows for resource providers with fewer specialized skillsets to customize the stitching frameworks. Embodiments further facilitate re-use of code across resource providers, improving efficiency and reducing consulting fees.

Example of a Computing System for Stitching Event Data Using Data Science Notebooks Any suitable computing system or group of computing systems can be used for performing the operations described herein. For example, FIG. 8 depicts examples of a computing system 800 (which may be substantially similar to the event analytics system 110 of FIG. 1) that executes an event management module 111 and notebooks 112. In some embodiments, the computing system 800 also executes an event reporting module 116, as depicted in FIG. 8. In other embodiments, a separate computing system having devices similar to those depicted in FIG. 8 (e.g., a processor, a memory, etc.) executes the event reporting module 116.

The depicted examples of a computing system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, such as input or output devices. For example, the computing system 800 is shown with one or more input/output ("I/O") interfaces 808. An I/O interface 808 can receive input from input devices or provide output to output devices. One or more buses 806 are also included in the computing system 800. The bus 806 communicatively couples one or more components of a respective one of the computing system 800.

The computing system 800 executes program code that configures the processor 802 to perform one or more of the operations described herein. The program code includes, for example, the event management module 111, the notebooks 112, or other suitable applications that perform one or more operations described herein. The program code may be resident in the memory device 804 or any suitable computer-readable medium and may be executed by the processor 802 or any other suitable processor. The memory 804 may further store event data 120 and identity mappings 122. In some embodiments, the event management module 111, the notebooks 112, the event reporting module 116, the event data 120, and the identity mappings 122 are stored in the memory device 804, as depicted in FIG. 8. In additional or alternative embodiments, one or more of the event management module 111, the notebooks 112, the event reporting module 116, the event data 120, and the identity mappings 122 are stored in different memory devices of different computing systems. In additional or alternative embodiments, the program code described above is stored in one or more other memory devices accessible via a data network.

The computing system 800 can access one or more of the event data 120 and the identity mappings 122 in any suitable manner. In some embodiments, some or all of one or more of these datasets, models, and functions are stored in the memory device 804, as in the example depicted in FIG. 8. For example, a computing system 800 that executes the event management module 111 can provide access to the event data 120 by external systems that execute the event reporting module 216.

In additional or alternative embodiments, one or more of these datasets, models, and functions are stored in the same memory device (e.g., memory 804). For example, a common computing system, such as the event analytics system 110 depicted in FIG. 1, can host the event management module 111 and the event reporting module 116 as well as the identity mappings 122. In additional or alternative embodiments, one or more of the programs, datasets, models, and functions described herein are stored in one or more other memory devices accessible via a data network.

The computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and the like. The computing system 800 is able to communicate with one or more other computing devices (e.g., a resource provider system 106A, as shown in FIG. 1) via a data network using the network interface device 810.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method comprising:
providing, by an event management system to a resource provider system for display, a data science notebook, wherein the data science notebook is an interactive environment for managing algorithms and data;
providing, by the event management system via the data science notebook, a plurality of interface elements for selecting a respective plurality of visitor stitching frameworks, wherein each visitor stitching framework, of the plurality of visitor stitching frameworks, includes a respective code for visitor stitching,
receiving, by the event management system from the resource provider system via the data science notebook, user selection of an initial visitor stitching framework of the plurality of visitor stitching frameworks, wherein the initial visitor stitching framework comprises a code for visitor stitching and the visitor stitching framework is received via selection of an interface element, of the plurality of interface elements, corresponding to the visitor stitching framework;
providing, by the event management system, the initial visitor stitching framework and an example of output of the initial visitor stitching framework via the data science notebook;
receiving, by the event management system from the resource provider system via the data science notebook, a modification to the initial visitor stitching framework, the modification altering the code for visitor stitching;
applying, by the event management system, the modification to the initial visitor stitching framework to generate a custom visitor stitching framework;
processing, by the event management system, a dataset associated with the resource provider system and a user using the custom visitor stitching framework to generate a stitched dataset associated with the user by executing the custom visitor stitching framework, wherein processing the dataset using the custom visitor stitching framework comprises generating an identity mapping comprising a data structure that maps an identifier of the user to a device identifier; and
using the generated identity mapping to update the dataset, thereby generating the stitched dataset.

2. The method of claim 1, wherein the resource provider system is a first resource provider system, the modification is a first modification, the custom visitor stitching framework is a first custom visitor stitching framework, the stitched dataset is a first stitched dataset, and the user is a first user, the method further comprising:
receiving, by the event management system from a second resource provider system, a second modification to the initial visitor stitching framework;
applying, by the event management system, the second modification to the initial visitor stitching framework to generate a second custom visitor stitching framework; and
processing, by the event management system, a second dataset associated with the second resource provider system and a second user using the second custom visitor stitching framework to generate a second stitched dataset associated with the second user.

3. The method of claim 1, further comprising:
generating, by the event management system based on the stitched dataset, a device graph associating the user with a plurality of user devices; and
providing, by the event management system to the resource provider system, data for display of the device graph, thereby causing the resource provider system to display the device graph on a display component of the resource provider system.

4. The method of claim 1, wherein receiving the modification to the initial visitor stitching framework comprises receiving a plugin to execute with the initial visitor stitching framework.

5. The method of claim 1, wherein the example of output of the initial visitor stitching framework comprises a plurality of timestamps and a respective plurality of user identifiers.

6. A computing system comprising a processor and a non-transitory computer-readable medium coupled to the processor, the non-transitory computer-readable medium comprising:
an event management module configured to, when executed by the processor:
provide a data science notebook to a resource provider system for display, wherein the data science notebook is an interactive environment for managing algorithms and data;
provide, via the data science notebook, a plurality of interface elements for selecting a respective plurality of visitor stitching frameworks, wherein each visitor stitching framework, of the plurality of visitor stitching frameworks, includes a respective code for visitor stitching,
receive, from the resource provider system via the data science notebook via the data science notebook, user selection of an initial visitor stitching framework of the plurality of visitor stitching frameworks, wherein the initial visitor stitching framework comprises a code for visitor stitching and the visitor stitching framework is received via selection of an interface element, of the plurality of interface elements, corresponding to the visitor stitching framework;
provide the initial visitor stitching framework and an example of output of the initial visitor stitching framework via the data science notebook;
receive, from the resource provider system via the data science notebook, a modification to the initial visitor stitching framework, the modification altering the code for visitor stitching;
apply the modification to the initial visitor stitching framework to generate a custom visitor stitching framework;
process a dataset associated with the resource provider system and a user using the custom visitor stitching framework to generate a stitched dataset associated with the user by executing the custom visitor stitching framework, wherein processing the dataset using the custom visitor stitching framework comprises generating an identity mapping comprising a data structure that maps an identifier of the user to a device identifier; and
use the generated identity mapping to update the dataset, thereby generating the stitched dataset.

7. The system of claim 6, wherein the resource provider system is a first resource provider system, the modification is a first modification, the custom visitor stitching framework is a first custom visitor stitching framework, the stitched dataset is a first stitched dataset, and the user is a first user, the event management module further configured to:
receive, from a second resource provider system, a second modification to the initial visitor stitching framework;
apply the second modification to the initial visitor stitching framework to generate a second custom visitor stitching framework; and
process a second dataset associated with the second resource provider system and a second user using the second custom visitor stitching framework to generate a second stitched dataset associated with the second user.

8. The system of claim 6, the system further comprising:
an event reporting module configured to, when executed by the processor:
generate, based on the stitched dataset, a device graph associating the user with a plurality of user devices; and
provide, to the resource provider system, data for display of the device graph, thereby causing the resource provider system to display the device graph on a display component of the resource provider system.

9. The system of claim 6, wherein receiving the modification to the initial visitor stitching framework comprises receiving a plugin to execute with the initial visitor stitching framework.

10. The system of claim 6, wherein the example of output of the initial visitor stitching framework comprises a plurality of timestamps and a respective plurality of user identifiers.

11. A non-transitory computer-readable medium having instructions stored thereon, the instructions executable by a processing device to perform steps comprising:
providing a data science notebook to a resource provider system for display, wherein the data science notebook is an interactive environment for managing algorithms and data;
providing, via the data science notebook, a plurality of interface elements for selecting a respective plurality of visitor stitching frameworks, wherein each visitor stitching framework, of the plurality of visitor stitching frameworks, includes a respective code for visitor stitching;
receiving, from the resource provider system via the data science notebook, user selection of an initial visitor stitching framework of the plurality of visitor stitching frameworks, wherein the initial visitor stitching framework comprises a code for visitor stitching and the visitor stitching framework is received via selection of an interface element, of the plurality of interface elements, corresponding to the visitor stitching framework;
providing the initial visitor stitching framework and an example of output of the initial visitor stitching framework via the data science notebook;
receiving, from the resource provider system via the data science notebook, a modification to the initial visitor stitching framework, the modification altering the code for visitor stitching;
applying the modification to the initial visitor stitching framework to generate a custom visitor stitching framework;
processing a dataset associated with the resource provider system and a user using the custom visitor stitching framework to generate a stitched dataset associated with the user by executing the custom visitor stitching framework, wherein processing the dataset using the custom visitor stitching framework comprises generating an identity mapping comprising a data structure that maps an identifier of the user to a device identifier; and using the generated identity mapping to update the dataset, thereby generating the stitched dataset.

12. The non-transitory computer-readable medium of claim 11, wherein the resource provider system is a first resource provider system, the modification is a first modification, the custom visitor stitching framework is a first custom visitor stitching framework, the stitched dataset is a first stitched dataset, and the user is a first user, the steps further comprising:
receiving, from a second resource provider system, a second modification to the initial visitor stitching framework;
applying the second modification to the initial visitor stitching framework to generate a second custom visitor stitching framework; and
processing a second dataset associated with the second resource provider system and a second user using the second custom visitor stitching framework to generate a second stitched dataset associated with the second user.

13. The non-transitory computer-readable medium of claim 11, the steps further comprising:
generating, based on the stitched dataset, a device graph associating the user with a plurality of user devices; and
providing, to the resource provider system, data for display of the device graph, thereby causing the resource provider system to display the device graph on a display component of the resource provider system.

14. The non-transitory computer-readable medium of claim 11, wherein receiving the modification to the initial visitor stitching framework comprises receiving a plugin to execute with the initial visitor stitching framework.

15. The non-transitory computer-readable medium of claim 11, wherein the example of output of the initial visitor stitching framework comprises a plurality of timestamps and a respective plurality of user identifiers.

* * * * *